July 3, 1923.
J. F. MILLER
RESILIENT WHEEL
Filed July 22, 1922
1,460,494
3 Sheets-Sheet 1
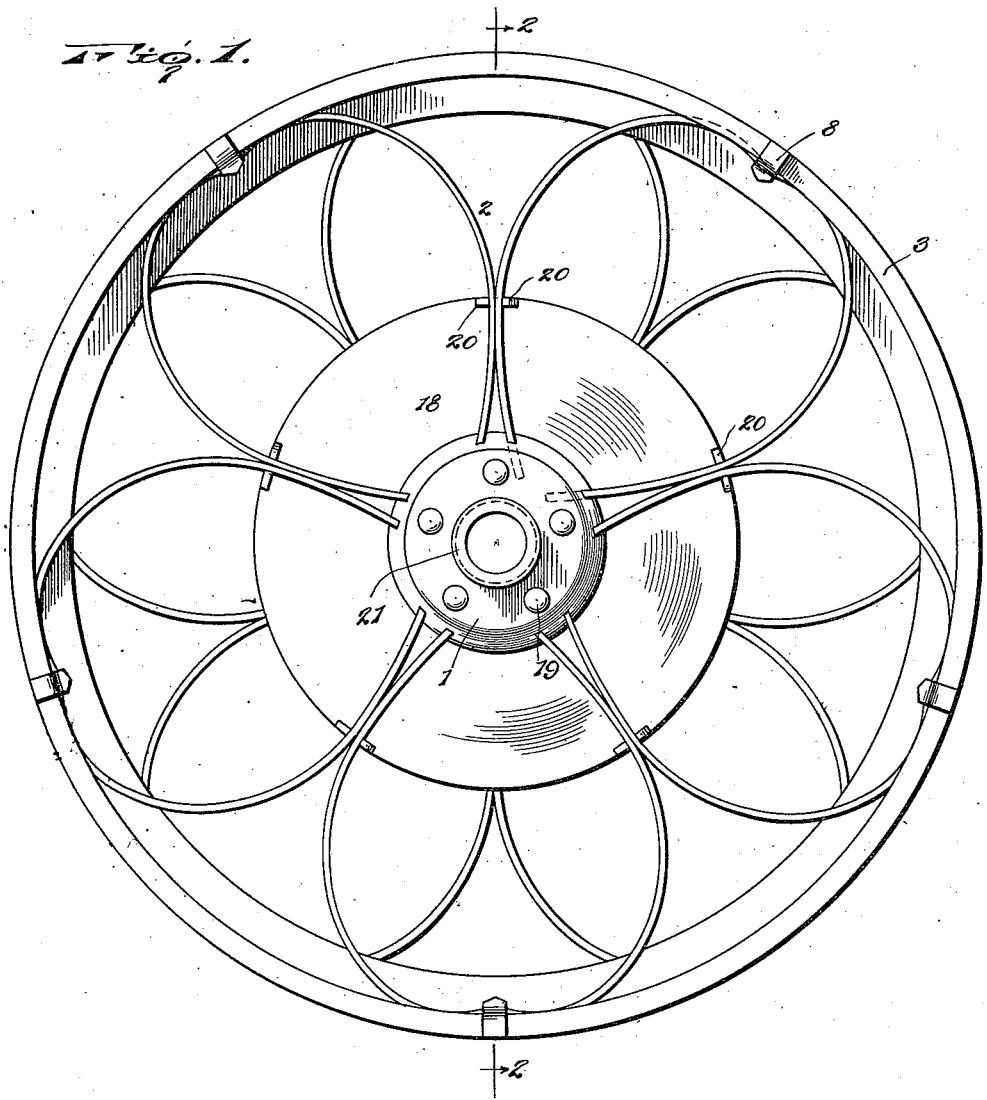
Fig. 1.
Fig. 4.
Inventor
J. F. Miller.
By 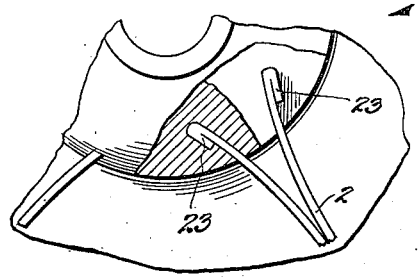 Attorneys

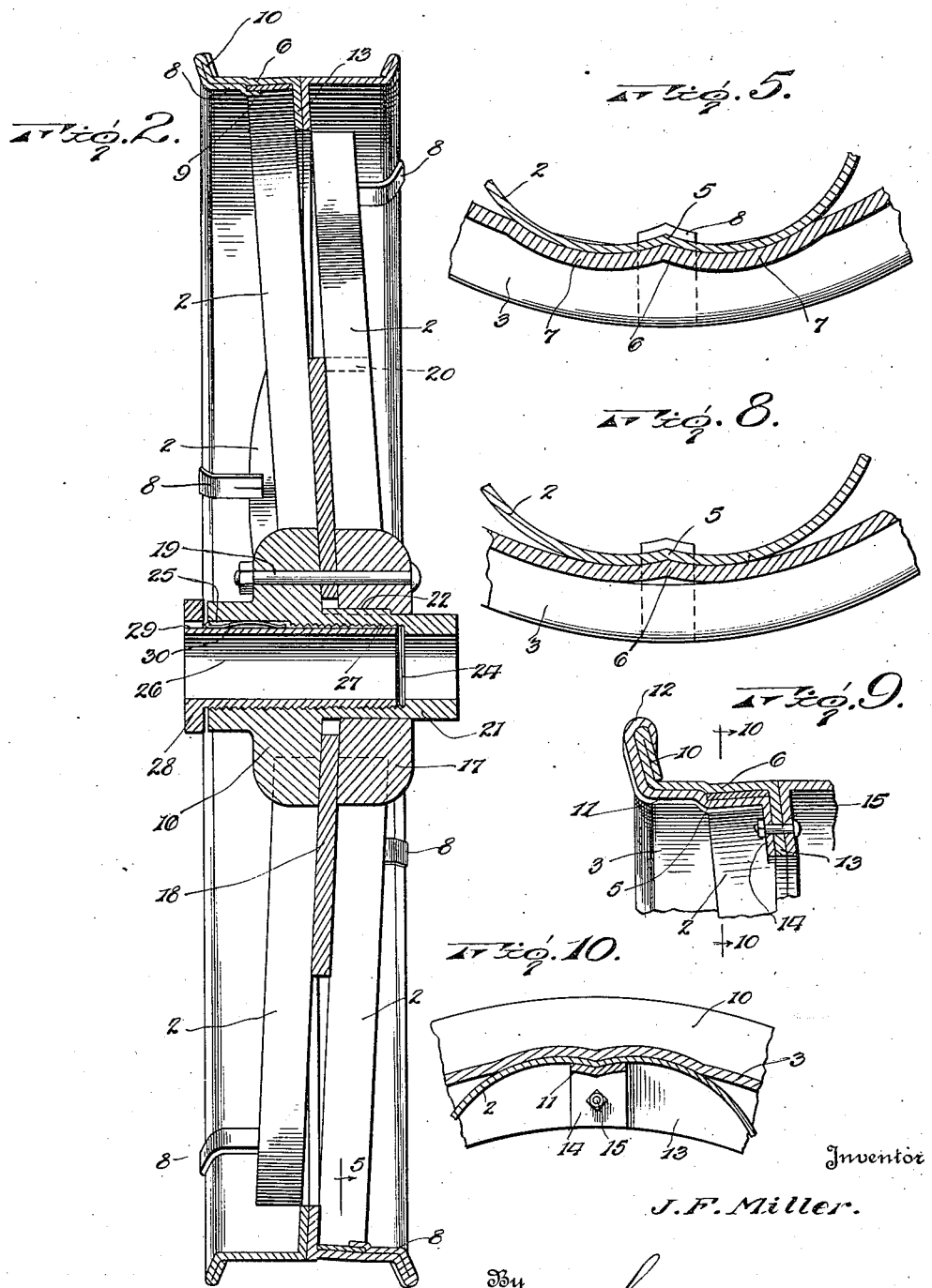

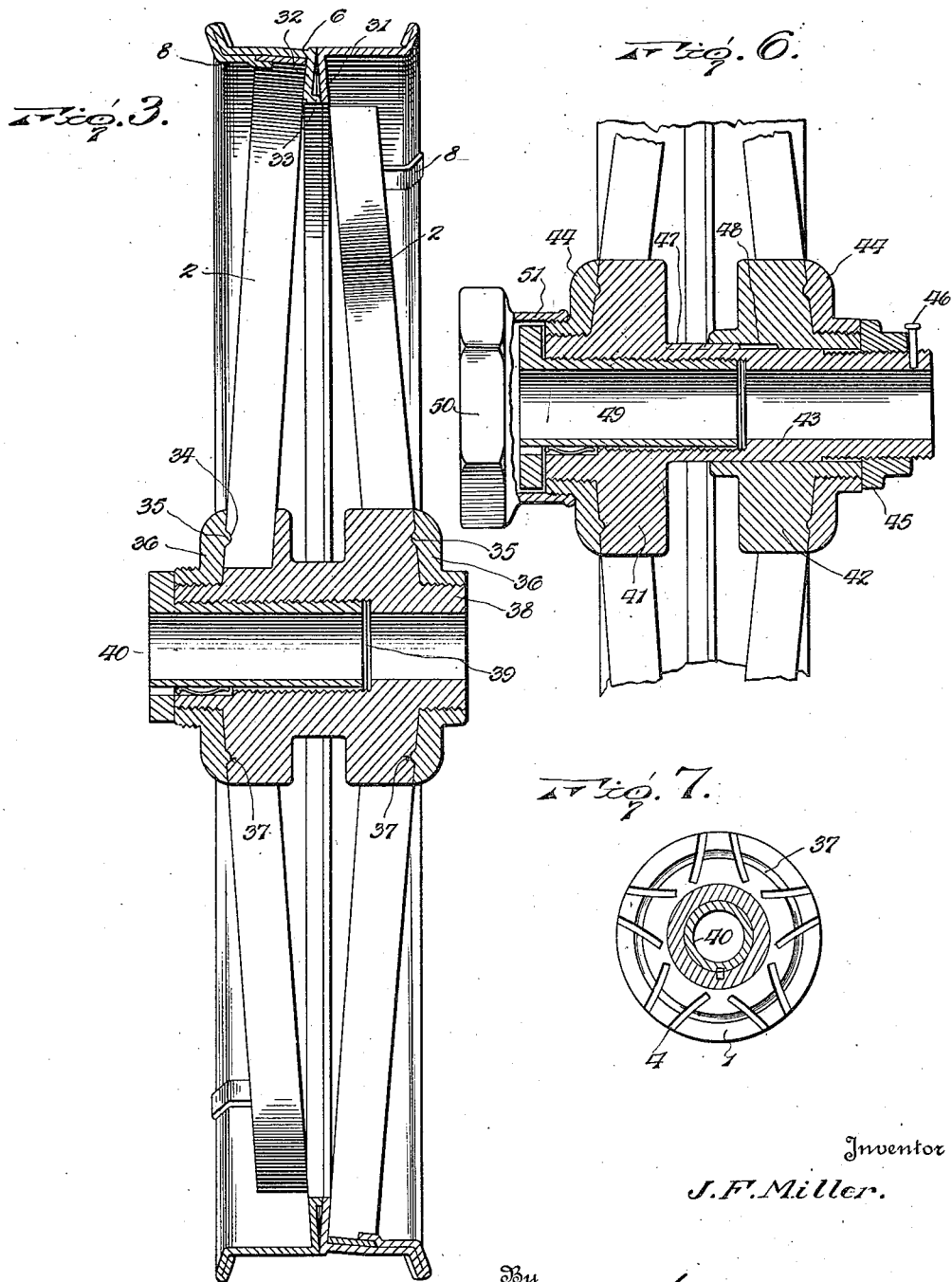

Patented July 3, 1923.

1,460,494

UNITED STATES PATENT OFFICE.

JAMES F. MILLER, OF MINDEN, LOUISIANA.

RESILIENT WHEEL.

Application filed July 22, 1922. Serial No. 576,743.

*To all whom it may concern:*

Be it known that I, JAMES F. MILLER, a citizen of the United States, residing at Minden, in the parish of Webster and State of Louisiana, have invented certain new and useful Improvements in Resilient Wheels, of which the following is a specification.

My invention relates to resilient wheels and one object is to provide a novel form of resilient spoke. Another object of the invention is to provide novel means for retaining the spoke against displacement relative to the hub and rim of the wheel, and a further object of the invention is to provide means whereby the hub may be readily adapted to axles of various lengths. A still further object of the invention is to provide a construction whereby the tension of the spokes may be varied when necessary. Other objects will appear incidentally in the course of the following description, and the invention resides in certain novel features which will be particularly pointed out in the claims following the description.

In the accompanying drawings—

Figure 1 is a side elevation showing one embodiment of the invention;

Fig. 2 is an enlarged transverse section on the line 2—2 of Fig. 1;

Fig. 3 is a view similar to Fig. 2, but showing another form of the invention;

Fig. 4 is a detail end elevation, partly broken away and in section, of a hub embodying the invention;

Fig. 5 is an enlarged detail section on the line 5—5 of Fig. 2;

Fig. 6 is an enlarged section taken longitudinally of the hub and showing another form of the invention;

Fig. 7 is an end view of the hub partly broken away and in section;

Fig. 8 is a view similar to Fig. 5, but showing a slightly different form of the invention;

Fig. 9 is an enlarged transverse section through the rim showing another form of the invention, and Fig. 10 is a detail section on the line 10—10 of Fig. 9.

A wheel embodying my invention includes a hub 1, spokes 2, and a rim 3. The spokes are resilient bands doubled or folded upon themselves so that the ends of the bands are brought close together to be received within notches or slots 4 in the ends of the hub, being retained therein by various means which will be presently specifically set forth. The intermediate portions of the resilient bands constituting the spokes are preferably slightly crimped upon themselves, as shown at 5, and the rim is shaped accordingly, as shown at 6, whereby the peak or ridge of the crimp in the rim will engage the trough or seat in the crimp of the spoke and thereby tend to prevent the movement of the spoke longitudinally of the rim or circumferentially of the wheel. The crimp 6 in the rim may be merely struck inwardly from the circumferential wall of the rim, as shown in Fig. 8, or the rim may be pressed outwardly at opposite sides of the crimp to form longitudinal seats 7 which will receive the bowed portions of the spokes at opposite sides of the crimp 5 therein, as shown in Fig. 5, thereby providing a firm seat for the outer portions of the spokes, as will be readily understood. The crimps 6 in the rim are, of course, disposed transversely of the rim and they are also slightly depressed at one end, the depressed end being the outer end of the crimp in the form shown in Fig. 2 wherein the spokes are so disposed as to impart a dish to the wheel corresponding to the dish commonly employed in ordinary rigid wheels. To further aid in securing the outer portions of the spokes in place, I provide clips or holding members 8 which extend transversely of the rim over the inner circumference thereof and have their inner ends slightly offset, as shown at 9, to form lips to clamp the spokes against the rim, the outer edges of the spokes being received between the lips and the rim, as will be readily understood. In the form of the invention shown in Fig. 2, the clips are in the form of tongues struck up from the outwardly extending flanges 10 of the rim and doubled over upon the outer sides of the same and then folded across the rim, as clearly shown. In the form of the invention shown in Figs. 9 and 10, the clip 11 is a separate member consisting of a strip of metal having its outer end formed into a hook 12 whereby it may be engaged over the outer edge of the flange 10 of the rim and having its intermediate portion shaped to fit closely against the inner circumference of the rim and the outer side of the flange 10, the inner end portion of the clip being extended entirely across the crimp of the spoke and having its extremity bent sharply inwardly to fit against the central rib or flange 13 of the rim, as shown at 14, and be secured to said rib or flange by a bolt or rivet 15.

In the form of the invention illustrated in Fig. 2, the rim is provided on its inner circumference with a central rib or flange 13 and it is preferably constructed of two annular members, each constituting one-half of the rim and held against separation by bolts or rivets or other fastening devices inserted through the ribs or flanges 13 which project inwardly from their inner edges. This construction facilitates the assembling of a tire upon the rim and also facilitates the assembling of the spokes and hub. The ribs or flanges 13 are disposed at an angle to the longitudinal plane of the wheel so as to incline toward the inner side of the wheel, and the spokes 2 are arranged in contact with the said rib or flange whereby they assume a like angle to the longitudinal plane of the wheel and produce the dished effect which is desired.

The hub is constructed in two sections 16 and 17 which receive between them a reinforcing disk or annulus 18 which is held in position between the inner opposed end faces of the sections by bolts or similar fastening devices 19 inserted through the hub sections and the inner portions of the disk. This disk 18 is disposed at an angle corresponding to the obliquity of the spokes and at intervals around its outer edge is provided with lateral lugs 20 arranged in pairs with the spokes passing between the members of the several pairs, as clearly shown in Fig. 1. The spokes are thus held together at approximately the centers of their side portions and are not only held against displacement but are also reinforced so that the resilient action of the spokes is concentrated in the outer portions thereof and greater elasticity thereby imparted to the wheel so that its easy riding qualities are enhanced. Upon reference to Fig. 2, it will be noted that the hub section 16 has a sleeve or tubular extension 21 projecting centrally from its inner face and the section 17 is provided with a central opening through which the said sleeve extends, the sleeve thus constituting the axle-encircling member whereby the hub is fitted to and supported by the axle. The sleeve 21 is constructed with a longitudinal rib 22 adapted to fit within a longitudinal groove in the section 17 and relative rotation of the sections is thereby prevented. This construction permits the hub sections to be readily adjusted to the widths of the spokes and the thickness of the spacing reinforcing disk 18 so that, when the hub sections are fastened together, the ends of the spokes will be firmly clamped in place. To prevent withdrawal of the spokes from the hub, I may provide their inner ends with enlargements 23, shown in Fig. 4, which may be conveniently formed by doubling the extremities of the spokes upon themselves, as shown. The grooves or recesses 4 in the ends of the hub members will be correspondingly shaped and the ends of the spokes will be slid endwise into the slits so as to be firmly seated therein. In the form of the invention shown in Fig. 2, the slits or grooves are in the inner faces of the hub sections so that, when the hub sections are brought together and secured, the spokes will be firmly clamped against the central reinforcing disk 18.

It is intended that my improved resilient wheel be supplied to users in such form that any wheel may be readily fitted upon the axle of any vehicle and as the wheel-carrying portions of the axles are not all the same length, it is necessary to provide means whereby the hub may be extended or elongated so that it may be fitted to any axle without permitting excessive play of the wheel longitudinally of the axle. I accomplish this result by enlarging the bore of the sleeve 21, as shown at 24, and internally threading the enlarged portion, a shallow longitudinal groove 25 being provided at the outer end of the bore, as clearly shown. Within the enlarged internally threaded portion of the bore, I engage a thimble or skein 26 having a longitudinal groove 27 upon its exterior and having an annular head or enlargement 28 at one end, the said head being provided with an opening 29 therethrough in alinement with the groove 27, as shown. A bowed leaf spring 30 is fitted in the groove 25 and the groove 27 when they register and rotation of the skein or thimble within the hub will be thereby prevented. Obviously, rotation of the thimble or skein will cause it to move endwise or longitudinally within the hub, and the head or enlargement 28 may be thereby readily brought into any desired spaced relation to the outer end of the hub and, consequently, the inner end of the hub will be held against the annular shoulder or other form of stop provided on the axle and against which the hub should bear. When the usual axle nut and cap are fitted upon the extremity of the axle, the wheel will be effectually secured in place and the dust cap may be provided with an elongated rim or annular flange to extend over the head 28. In Fig. 6, I have shown the dust cap as thus formed. Should it become necessary to readjust the hub of the wheel, the latch spring 30 may be readily withdrawn by inserting any convenient hooked tool through the opening 29 and engaging said tool in the end of the latch. After the latch has been withdrawn, the thimble or skein may be readily rotated so as to be adjusted in the bore of the hub as is obvious.

In Fig. 3, I have shown my invention embodied in a wheel in which the spokes are not dished but converge from the hub toward the rim. The annular rib or flange 31 of one rim section is, in this form of the invention, constructed exactly as in the previously described form, although it may be given a slightly more acute angle. The rib 32, however, will be disposed in diverging relation to the rib 31 and has its inner free edge provided with an annular projection 33 extending toward and abutting the rib or flange 31 so as to close the inner end of the space between the two ribs or flanges and thereby prevent the collection of dust and dirt in said space. This annular projection also reinforces the inner free edges of the ribs so that they will more effectually resist any tendency of the spokes to lateral displacement. The spokes are constructed in their outer portions in the same manner and form as in the previously described embodiment of the invention, but at their inner ends are provided with notches 34 upon their outer edges which are adapted to be engaged by annular ribs or beads 35 on the clamping collars 36 whereby the spokes will be firmly secured in the hub and held against radial withdrawal. In this form of the invention, the hub is constructed in a single member and the spokes-receiving grooves, slits, or recesses are formed in the outer ends of the hub. In each end of the hub is an annular groove 37 to accommodate the annular bead or rib 35 upon the clamping collars 36 and at each end of the hub is an externally threaded boss or extension 38 upon which the clamping collars are engaged, as shown and as will be readily understood. It will, of course, be understood that the clamping collars are provided with bosses or heads at their centers which may be readily engaged by a wrench or other turning tool so that they may be readily turned home against the respective end of the hub. As in the previously described form of the invention, the hub is provided with an enlarged internally threaded portion 39 at its outer end which receives a thimble or skein 40 corresponding in all respects to the thimble or skein 26.

In Fig. 6, I have illustrated a construction of hub which is especially adapted to vary the tension of the spokes. The spokes are, of course, tempered to a normal degree of resiliency and are set in the hubs so that, when moderately free, they will respond to this normal degree of resiliency. It is desirable, however, when applying resilient wheels to trucks to provide means whereby the spokes may be stiffened under a heavy load so that they will not collapse to too great an extent but will effectually support the load. This need is met in the construction shown in Fig. 6, in which the hub is constructed of two members 41 and 42 telescopically fitted together, the member 41 being provided with a tubular extension 43 extending through a central opening in the member 42 in much the same manner as the sleeve 21 extends through the central opening of the hub section 17 in the first described form of the invention. In the form shown in Fig. 6, however, the inner ends of the spokes are secured in the hub members by collars 44 fitted upon externally threaded bosses at the outer ends of the hub sections, as clearly shown, and operating in the same manner as the clamping collars 36, shown in Fig. 3. The inner extremity of the sleeve 43, however, is externally threaded and a nut 45 is mounted thereon and turned home against the outer ends of the inner hub member 42 and the clamping collar 44 mounted thereon so that the said hub member 42 may be set closer to or farther from the member 41, and it will, of course, be understood that the adjustment movement is shared by both hub sections, the sleeve 43 moving outwardly or inwardly through the nut and the hub section 42 moving outwardly or inwardly relatively in the same direction as the nut moves. A cotter pin 46 or other locking means may be engaged with the inner end of the sleeve 43 to prevent displacement of the nut 45 after the hub sections have been adjusted. The relative rotation of the hub sections is prevented by the engagement of a longitudinal rib 47 upon the hub section 41 within a longitudinal groove 48 in the bore of the hub section 42, as shown and as will be readily understood. A skein or thimble 49 is engaged within the outer enlarged portion of the bore of the hub member 41 and corresponds in all respects to the thimbles or skeins 26 and 40, previously described. A dust cap 50 is fitted over the axle and the enlarged head of the skein or thimble 49 and the rim 51 of this dust cap is preferably internally threaded to engage external threads upon the boss of the adjacent clamping collar 44, as shown, so that access of dust to the interior of the hub will be prevented and a neat finish imparted to the wheel.

From the foregoing description, taken in connection with the accompanying drawings, it will be seen that I have provided a very simple, light but durable and efficient wheel which may be readily produced and applied to any vehicle and by the use of which the employment of pneumatic tires will be unnecessary in order to avoid the discomforts, shocks and wear and tear incident to the travel over rough roads. The resilient spokes in my device are effectually held in place at the rim and at the hub but at the same time should a spoke be broken, a new spoke may be very quickly and easily substituted therefor.

While my resilient wheel is intended primarily for use with solid or cushion tires, pneumatic tires may be used thereon without any change in construction except the provision of an opening to accommodate the inflation valve.

Having thus described the invention, what is claimed as new is:

1. In a wheel, the combination of a hub, a rim having a central annular rib upon its inner circumference, spokes consisting of bowed resilient bands having their ends secured in the hub and their outer intermediate bowed portions bearing against the inner circumference of the rim and against opposite sides of the central rib thereon, and clips fixed to the flanges of the rim and extending radially inward on the outer sides of said flanges and transversely to the inner circumference of the rim and the bowed portions of the spokes and secured to the sides of the central rib upon the rim.

2. In a wheel, the combination of a hub, a rim having its circumference crimped transversely at intervals with the peaks of the crimps projecting inwardly from the circumference, spokes consisting of bowed resilient bands having their ends secured within the hub and their outer bowed portions provided with transversely extending crimps adapted to seat upon the crimps in the rim, and clips carried by the rim and engaging the crimped portions of the spokes.

3. In a wheel, the combination of a hub, a rim having its circumference crimped transversely at intervals with the peaks of the crimps projecting inwardly from the circumference and one end of the crimp deeper than the opposite end thereof, spokes consisting of bowed resilient bands having their ends secured within the hub and their outer bowed portions provided with transversely extending crimps adapted to seat upon and extend across the crimps in the rim, and clips carried by the rim and engaging the crimped portions of the spokes to secure the spokes to the rim.

4. A wheel comprising a rim having a central annular rib upon its inner circumference, hub members provided in their inner opposed faces with spoke-receiving slits, a reinforcing disk fitted between the hub members and projecting annularly beyond the same, spokes consisting of bowed resilient bands disposed at opposite sides of the said disk and the central rib on the rim and having their ends engaged in the slits in the hub members and their outer bowed portions bearing against the inner circumference of the rim, means carried by the rim for engaging the bowed portion of the spokes and preventing displacement thereof, and laterally projecting lugs upon the said disk on the opposite sides of the same at the outer edge thereof to engage the side portions of adjacent spokes.

5. In a wheel, a rim, a hub consisting of coacting members, one of said members having a sleeve extension extending through a central opening in the other member, spokes having their ends engaged in the hub members and their intermediate portions secured to the rim, means for clamping the ends of the spokes in the hub members, means co-operating with the sleeve extension of the one hub member for securing the hub members in a set relative position to determine the tension of the spokes, and means for preventing relative rotation of the hub members.

In testimony whereof I affix my signature.

JAMES F. MILLER.